United States Patent [19]

Witte

[11] Patent Number: 4,886,257

[45] Date of Patent: Dec. 12, 1989

[54] DEVICE FOR FIXING WORKPIECES TO A TABLE

[75] Inventor: Horst Witte, Auf dem Deich Nr. 2, D-2122 Bleckede, Fed. Rep. of Germany

[73] Assignee: Horst Witte Entwicklungs-und Vertriebs KG, Bleckede, Fed. Rep. of Germany

[21] Appl. No.: 144,721

[22] Filed: Jan. 14, 1988

Related U.S. Application Data

[63] Continuation of Ser. No. 917,420, Oct. 10, 1986, abandoned.

[30] Foreign Application Priority Data

Nov. 13, 1985 [DE] Fed. Rep. of Germany ....... 3540221

[51] Int. Cl.[4] ................................................. B23Q 3/00
[52] U.S. Cl. ......................................... 269/9; 269/900; 269/309; 269/10
[58] Field of Search .................... 269/95, 289 R, 309, 269/311, 900, 9, 10, 100

[56] References Cited

U.S. PATENT DOCUMENTS 3,229,365  1/1966  Fisher et al. .......................... 29/559
3,967,816  7/1976  Ramsperger et al. .............. 269/900
4,298,195 11/1981  McDougal .......................... 269/900
4,445,678  5/1984  George ................................ 269/900

FOREIGN PATENT DOCUMENTS 2626155 12/1977 Fed. Rep. of Germany .

*Primary Examiner*—Judy Hartman
*Attorney, Agent, or Firm*—Staas & Halsey

[57] ABSTRACT

A system for the assembly of devices for fixing workpieces to machine tool tables, including a base plate, which can be fixed to the machine tool table, or the like. Fitting holes are formed in the base plate with regular coordinate spacings. In the base plate, in a plane at right angles to the fitting holes, are formed preferably intersecting cross holes, whose diameter corresponds to that of the fitting holes. Nuts for the fitting screws are inserted both in the cross holes and the fitting holes, in order to fix mounting parts to the base plate. The cross-section of each nut corresponds to that of each cross and fitting hole. The mounting parts are preferably provided with cross and fitting holes similar in arrangement to the base plate. As the grid size corresponds to the thickness of the base plate and mounting parts and the external dimensions can be divided by the grid size, numerous possible combinations result from the intersecting fitting and cross holes, whose diameter preferably corresponds to half the grid size.

8 Claims, 1 Drawing Sheet

Fig.3 (C-D) 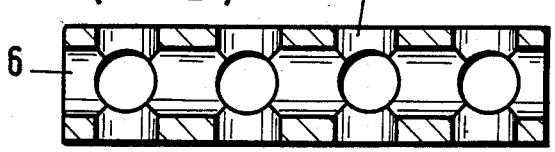

Fig.7 (A-B) 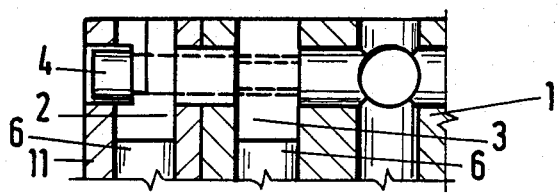

DEVICE FOR FIXING WORKPIECES TO A TABLE

This is a continuation of co-pending application Ser. No. 917,420 filed on Oct. 10, 1986, now abandoned.

BACKGROUND OF THE INVENTION

The present invention relates to a system of assembling devices for fixing workpieces to machine tool tables.

In a known system of the aforementioned type (German Pat. No. 26 26 155), larger diameter sections are located on the underside of the base plate for receiving or mounting nuts, into which fitting screws are screwed. This permits a fixing of mounting or reception parts on only one side, i.e. on the top of the base plate.

SUMMARY OF THE INVENTION

The object of the present invention is to provide a system of the aforementioned type, which is made more universally usable in that reception or mounting parts can also be attached to the base plate sides adjacent to the base plate top surface.

This object is solved by using a parallelepipedic basic element based on the one known from U.S. Pat. No. 3,229,365. However, this known basic element only has intersecting holes for receiving fastening screws. Larger diameter sections are provided on the ends for the screw heads or nuts. The invention makes it possible to associate the nuts with any individual fitting or cross hole, i.e., to insert same in the hole where fixing is to take place. This makes it possible to fix the mounting parts on all sides and to arrange the nuts in the holes even adjacent to the corresponding mounting parts. It is also easily possible to replace any damaged nuts. It is also possible to use fitting screws and nuts with different threads, i.e. according to different standards on the same base plate.

As a result of the coincidence of the diameter of the cross and fitting holes, the threaded parts can be inserted in both holes, i.e. where they are required for fixing a correspondingly arranged mounting part.

The universal usability is increased by intersecting bores.

Numerous different possible combinations are provided between base plates and mounting parts, the latter essentially constituting "small base plates". There is no need for the large number of mounting parts required in known systems, because with correspondingly well graded rectangular and square shapes, it is possible to fit any angle and cube construction.

The cross holes which essentially run in the midplane of the base plate make the complete system, i.e. the base plate and the correspondingly constricted mounting parts light.

The fitting holes are normally through-bores, so that both sides can be used as a work clamping area.

BRIEF DESCRIPTION OF THE DRAWINGS

The invention is described in greater detail hereinafter relative to a non-limitative embodiment and the attached drawings:

FIG. 3, is a section along line C–D of FIG. 1.

FIG. 7, is a section along line A–B of FIG. 4.

DETAILED DESCRIPTION OF THE PREFERRED EMBODIMENTS

Figure 1:
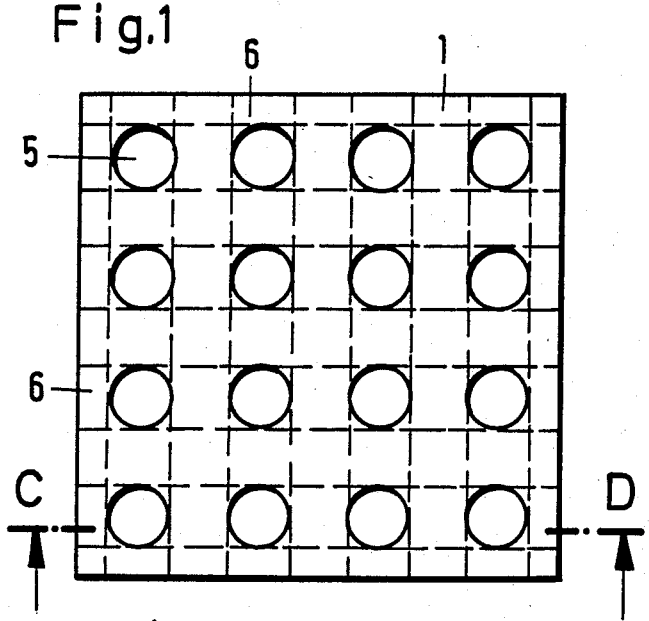
FIG. 1, is a plan view of a base plate for use in the system according to the invention without mounting parts.
Figure 2:
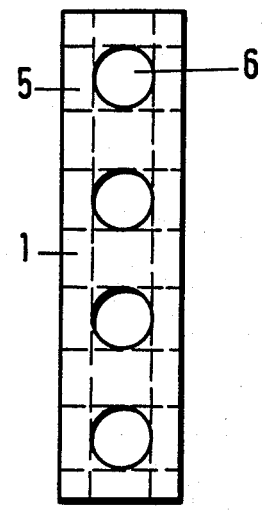
FIG. 2, is a side view of the base plate according to FIG. 1.
Figure 5:
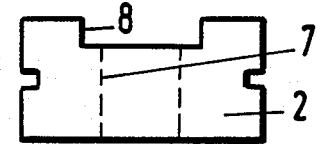
FIG. 5, is a side view of an abutment on a larger scale.
Figure 6:
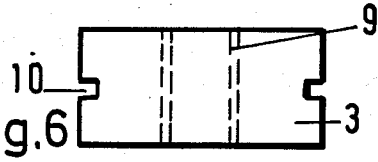
FIG. 6, is a side view of a nut on a larger scale.

A plurality of fitting holes 5 are constructed as through-bores in base plate 1 shown in drawings. Four adjacent fitting holes 5 form a square and consequently define a corresponding reference grid. In the plane at right angles to fitting holes 5, intersecting cross holes 6 pass on corresponding axes through juxtaposed fitting holes5. The diameter of the cross and fitting holes are identical and only the inlets and outlets of the cross holes 6 adjacent to the sides of base plate 1 are provided with fits corresponding to those of the fitting holes 5. The cross holes 6 are located in the midplane of the base plate 1, so that they do not significantly weaken the base plate 1, which is made very light as a result of the cross holes 6.

It is possible to place in the cross holes 6 and fitting holes 5 nuts 3 and abutments 2, whose cross-section corresponds to that of the cross and fitting holes. The nuts 3 have a thread 9 for the fitting screws. The abutments 2 have a through-bore 7 and a countersinking 8 for the fitting screw head.

Figure 4:
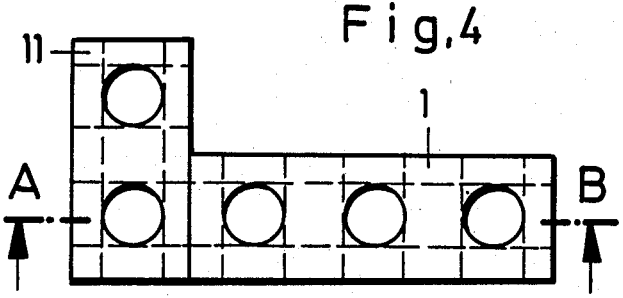
FIG. 4, is a side vide of a base plate with laterally attached mounting part, which is constructed according to the same principle as the base plate.
Figure 8:
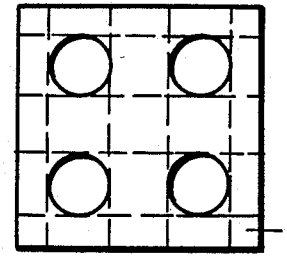
FIG. 8, is a side view of FIG. 4.

FIGS. 4, 7 and 8 show a reception or mounting part 11 connected to a base plate 1, said part 11 being provided according to the same principle as plate 1 with fitting and cross holes. As can be gathered from FIG. 7, in this case fixing takes place with the aid of a fitting screw 4, whose head is supported in an abutment 2 and is screwed into the thead 9 of a nut 3 located in the "second" cross hole 6.

Nuts 3 and abutments 2 are provided with mounts 10 for a tool, so that they can be moved into and positioned in the cross and fitting holes. They can also be provided with corresponding forced restraints by rubber rings, springs, etc, so that they can be positioned very easily at the desired point, i.e. following insertion a fitting screw strikes a corresponding thread.

It is readily apparent that there are a large number of possible combinations with few components. This more particularly applies in the case where the mounting parts 11 are constructed according to the same principle. They can be fixed laterally to base plate 1, when the corresponding nut part is inserted in a fitting hole. If the mounting parts are to be fixed on the large work clamping area of the base plate, the nuts are inserted in the cross holes.

As the grid size, i.e. the spacing of the fitting holes and therefore also the cross holes, e.g. 40 mm corresponds to the plate thickness and the external dimensions can be divided by the grid size, in conjunction with the cross and fitting holes passing in all three coordinated directions through the base plate and mounting parts, numerous possible combinations exist, which can be further increased if the diameter of the cross and fitting holes is equal to half the grid size.

What is claimed is:

1. A device for fixing a workpiece to a machine tool table, consisting of:

(a) a parallelopiped base plate mountable on the machine tool table and provided with (i) a first plurality of fitting holes each having a certain diameter and an axis and being arranged in equal coordinate spacings, (ii) a first plurality of parallel, coplanar cross holes having the same diameter as the first plurality of fitting holes and having axes intersecting at right angles with the axes of the first plurality of fitting holes, and (iii) a second plurality of parallel, coplanar cross holes having the same diameter as the first plurality of fitting holes and having axes intersecting with the axes of the first plurality of fitting holes and the first plurality of cross holes at right angles;

(b) a mounting part provided with a second plurality of fitting holes and third and fourth pluralities of cross holes, each of these holes having the same diameter as the first plurality of fitting holes and regular coordinate spacings identical to the first plurality of fitting holes of the base plate and intersecting axes like the first plurality of fitting holes and first and second pluralities of cross holes, and being connectable to the base plate by means of screws, nuts, and abutments wherein each screw and nut can be inserted in any one of the cross and fitting holes and the cross-section of the screw and nut is substantially the same as the diameter of the first plurality of fitting holes, (c) means for positioning the workpiece, said means being inserted into any one of said cross and fitting holes of the base plate and mounting part.

2. A device according to claim 1, wherein the base plate and the mounting part each have a same thickness equal to the distance between the axes of adjacent ones of the first plurality of fitting holes.

3. A device according to claim 1, wherein one of said abutments is provided with a recess and a through-bore in which said screw can be inserted said abutment being insertable in any one of the cross and fitting holes of the base plate and mounting part, said one abutment having a cross-section substantially the same as the diameter of the first plurality of fitting holes.

4. A device according to claim 3, wherein at least said one abutment and at least one of said nuts is provided on end faces thereof with mounts for receiving a positioning tool.

5. A device according to claim 1, wherein the diameter of the first plurality of fitting holes is equal to half the distance between axes of adjacent ones of the first plurality of fitting holes.

6. A device according to claim 2, wherein one of said abutments is provided with a recess and a through-bore in which said screw can be inserted said one abutment being insertable in any of the first through fourth pluralities of cross holes and any of the first and second pluralities of fitting holes, said one abutment having a cross-section substantially the same as the diameter of the first plurality of fitting holes.

7. A device according to claim 6, wherein at least said one abutment and at least one of said nuts is provided on the end faces thereof with mounts for receiving a positioning tool.

8. A device according to claim 2, wherein the diameter of the first plurality of fitting holes is equal to half the distance between axes of adjacent ones of the first plurality of fitting holes.

* * * * *